Feb. 17, 1925.
F. H. CRAGO
ANIMAL TRAP
Filed May 26, 1923
1,526,835
2 Sheets—Sheet 1
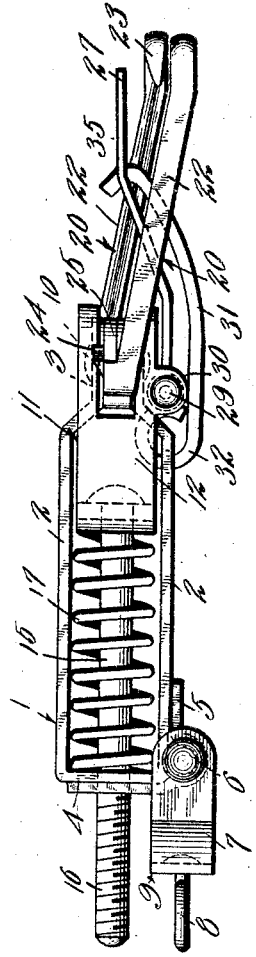
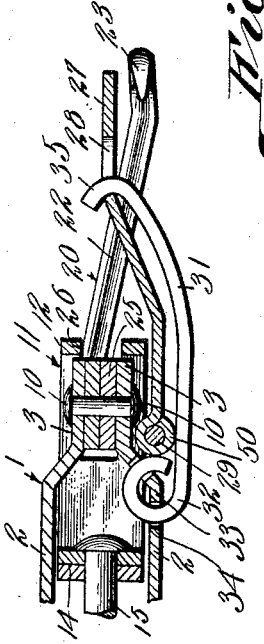
F. H. Crago, Inventor Feb. 17, 1925.
F. H. CRAGO
ANIMAL TRAP
Filed May 26, 1923    2 Sheets-Sheet 2
1,526,835
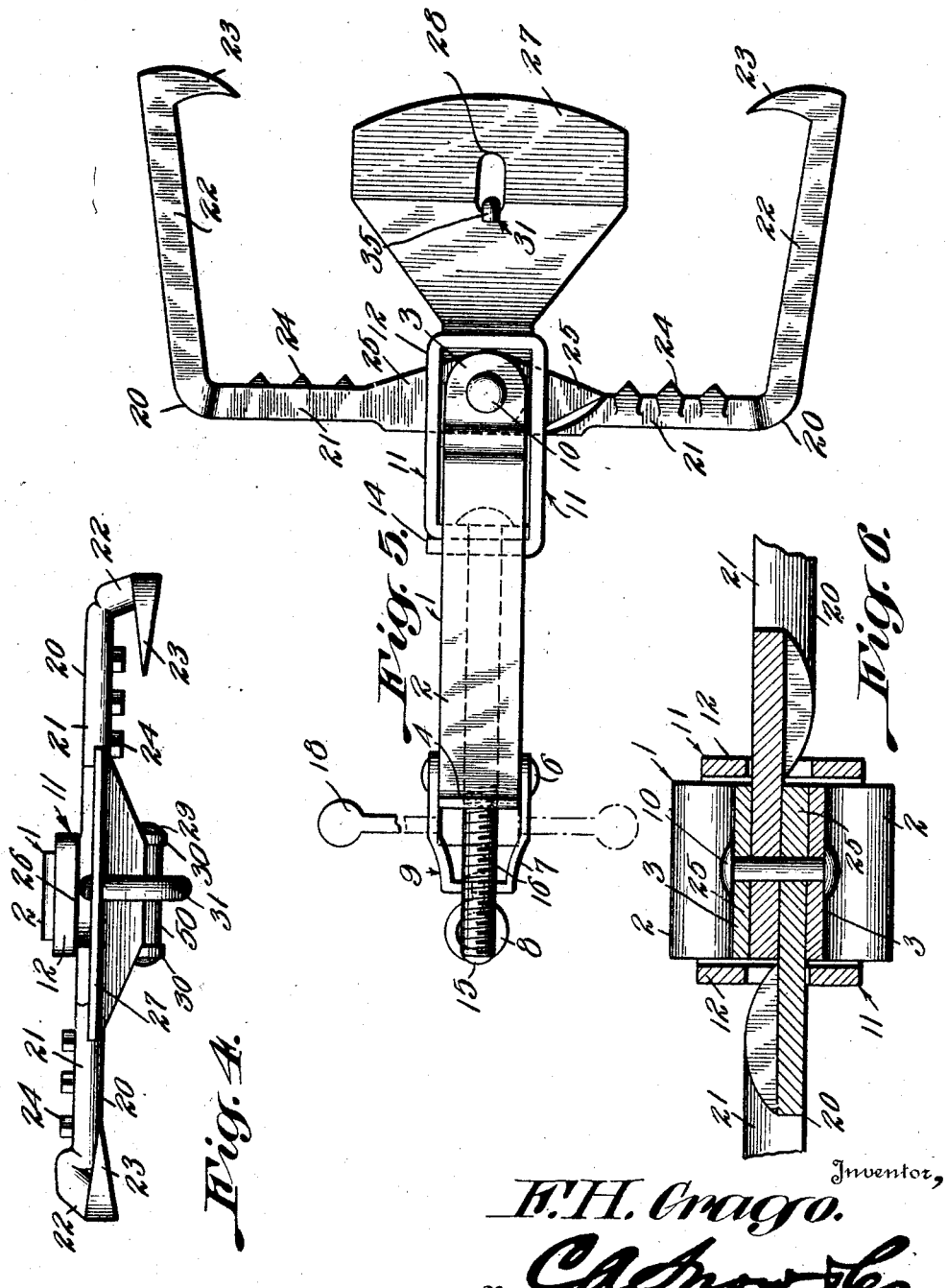

Patented Feb. 17, 1925.

1,526,835

UNITED STATES PATENT OFFICE.

FELIX H. CRAGO, OF MILLTOWN, MONTANA.

ANIMAL TRAP.

Application filed May 26, 1923. Serial No. 641,733.

*To all whom it may concern:*

Be it known that I, FELIX H. CRAGO, a citizen of the United States, residing at Milltown, in the county of Missoula and State of Montana, have invented a new and useful Animal Trap, of which the following is a specification.

The device forming the subject matter of this application is an animal trap, and the invention aims to provide a trap which is so constructed that, as the jaws of the trap are sprung, the jaw-carrying end of the trap will tend to swing upwardly, thereby giving the jaws a secure hold on the leg of the animal, well above the animal's foot. Another object of the invention is so to construct the trap that the same cannot be sprung by birds or small animals, the trap becoming operative, readily, when an animal of considerable size treads upon the trigger.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in side elevation, a trap constructed in accordance with the invention; Figure 2 is a fragmental longitudinal section taken through the forward end of the trap, parts being broken away and parts appearing in section; Figure 3 is a cross section taken through one of the jaws; Figure 4 is a front elevation of the trap; Figure 5 is a top plan of the trap; and Figure 6 is a fragmental transverse section.

In carrying out the invention, there is provided a frame 1, which, as shown in Figure 1, is substantially U-shaped in side elevation, the frame comprising L-shaped members 2, the forward ends 3 of which are in-set toward each other, the rear ends 4 of the member 2 being overlapped upon each other to form a double-thick bearing. At its end, the lowermost member 2 of the frame 1 carries a member 5 supporting a pivot element 6 whereon a yoke 7 is mounted to swing, an eye 8 being rotatable in the end of the yoke. The yoke and the eye, taken together may be alluded to as a shackle, denoted as a whole by the numeral 9. In the inset ends 3 of the frame 1, a vertical pivot member 10 is mounted.

The numeral 11 designates, generally, a rider mounted for reciprocation with respect to the frame 1, longitudinally of the frame. The rider 11 comprises a loop-shaped head 12 extended about the pivot member 10, the rear end of the head being located within the frame 1. The loop-shaped head 12 may be made out of a single piece of material having overlapped rear ends 14, wherein is secured the forward end of a stem 15, the stem constituting part of the rider 11. The rear end of the stem is threaded, as shown at 16, and is slidably mounted in the bearing formed by the parts 4 of the frame 1. A strong compression spring 16 is located within the frame 1 about a portion of the stem 15, the forward end of the spring 17 abutting against the ends, 14 of the head 12 of the rider 11, and the rear end of the spring abutting against the parts 4 of the frame 1. In order that the spring 17 may be compressed readily whilst the trap is being set, a lever nut 18 may be mounted on the threaded portion 16 of the stem 15, the lever nut abutting against the rear end of the frame 1, as indicated in Figure 5 of the drawings.

Angular jaws 20 are supplied, each jaw comprising an inner arm 21 and an outer arm 22 disposed at an angle to each other, the arms 22 slanting downwardly, as shown in Figure 1 of the drawings. The arms 22 carry inwardly projecting prongs 23. There are projecting teeth 24 on the arms 21 of the jaws, the teeth on the respective jaws being located out of horizontal alinement with each other, as shown in Figure 4, so as not to interfere with the closing movement of the jaws. The arms 21 of the jaws 20 are supplied at their inner ends with flattened heads 25 adapted to operate in a slot 26 formed in the forward end of the head 12 of the rider 11 and in the side portions of the head, the parts 25 being mounted pivotally on the member 10 of the frame 1.

A vertically swinging trigger plate 27 is located between the jaws 20, when the trap is set, as shown in Figure 5, the trigger plate being upwardly inclined, as disclosed in Figure 1. The trigger plate is provided with a seat or opening 28. The rear end of the trigger plate 27 is equipped with an eye 50, engaged about the pivot element 29, carried by depending ears 30 on the head 12 of the rider 11. The numeral 31 designates a latch, mounted for vertical swinging movement, and provided at its rear end with an eye 32 receiving a bearing 33 formed by fashioning openings 34 in the lower member 2 of the frame 1, as disclosed in Figure 2. At its forward end, the latch 31 is equipped with a hook-shaped finger 35 adapted to be engaged in the opening 28 of the trigger plate 27.

In practical operation, the rider 11 is drawn backwardly by the action of the lever nut 18, the spring 17 being compressed, the jaws 20 being swung to the open position depicted in Figure 5, the trigger plate 27 being swung upwardly and the finger 35 on the latch 31 being engaged in the opening 28 of the trigger plate. Then the lever nut 18 is removed, and the point of engagement between the finger 35 of the latch 31 and the trigger plate 27 with respect to the pivot elements 29 and 33 is such that the spring 17, as it tends to expand will hold the jaws 20 open, as shown in Figure 5. When an animal treads on the trigger plate 27, the plate tends to swing downwardly on its pivotal mounting 29 and the rider 11 moves forwardly under the action of the spring 17, the jaws 20 being closed together upon the animal. As the rider 11 moves forwardly, carrying with it the trigger plate 27, the latch 31, which is mounted pivotally on the frame 1 does not participate in this forward movement, but tends to swing downwardly, carrying the forward end of the trigger plate 27 downwardly into contact with the ground. The result is, that as the jaws 20 close together, the forward end of the trap, including the jaws 20, take an upward jump, so that the jaws grab the leg of the animal, well above the point of contact between the leg and the trigger plate 27—assuming that the foot of the animal is placed on the trigger plate. The result is that the animal is gripped securely, even though the animal starts to withdraw its foot from the trigger plate 27, after the jaws 20 have started to close.

When the trap is set, and is placed upon the ground, the trap has a three-point support, represented by the shackle 9 and by the prongs 23 of the jaws 20.

What is claimed is:—

In a device of the class described, a frame, a pivot element carried by the frame, jaws mounted to swing on the pivot element, a rider including a head extended about the pivot element and cooperating with the jaws when the rider is advanced, to close the jaws, the rider comprising a stem slidable in the frame, a compression spring about the stem and interposed between the frame and the head of the rider, a trigger pivoted to the rider, and a latch pivotally mounted on the frame and detachably interengaged with the trigger, the latch constituting means for swinging the trigger downwardly, when the trap is sprung, thereby to cause the forward end of the trap to jump upwardly.

In testimony that I claim the foregoing as my own, I have hereto affixed my signature in the presence of two witnesses.

FELIX H. CRAGO.

Witnesses:
S. N. STENSON,
W. R. TEAGARDEN.